United States Patent
Cai et al.

(10) Patent No.: US 8,849,286 B2
(45) Date of Patent: Sep. 30, 2014

(54) OPTIMIZING PARAMETER SETTING FOR HANDOVER OF MOBILE TERMINALS ON A TRANSPORTATION PLATFORM

(71) Applicant: Huawei Technologies Co., Ltd, Shenzhen (CN)

(72) Inventors: Tao Cai, Kista (SE); Henrik Olofsson, Kista (SE); Peter Legg, Kista (SE); Derek Richards, Swindon (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/145,603

(22) Filed: Dec. 31, 2013

(65) Prior Publication Data

US 2014/0113634 A1    Apr. 24, 2014

Related U.S. Application Data

(63) Continuation of application No. PCT/EP2012/058169, filed on May 3, 2012.

(51) Int. Cl.
*H04W 36/00* (2009.01)
*H04W 84/00* (2009.01)

(52) U.S. Cl.
CPC ........ *H04W 36/0005* (2013.01); *H04W 84/005* (2013.01); *H04W 36/0083* (2013.01)
USPC ............ 455/438; 455/439; 455/436; 370/331

(58) Field of Classification Search
USPC ........................... 455/438, 439, 436; 370/331
See application file for complete search history.

(56) References Cited

U.S. PATENT DOCUMENTS

| | | | |
|---|---|---|---|
| 2006/0142032 A1* | 6/2006 | Derakhshan et al. | 455/509 |
| 2006/0166677 A1* | 7/2006 | Derakshan et al. | 455/453 |
| 2008/0020766 A1* | 1/2008 | Chen et al. | 455/435.2 |
| 2009/0005045 A1 | 1/2009 | Kuriki et al. | |
| 2009/0129301 A1* | 5/2009 | Belimpasakis | 370/310 |
| 2010/0159954 A1* | 6/2010 | Rahman et al. | 455/456.3 |
| 2010/0173626 A1 | 7/2010 | Catovic et al. | |
| 2013/0171989 A1* | 7/2013 | Rahman et al. | 455/432.3 |
| 2013/0215764 A1* | 8/2013 | Breuer et al. | 370/242 |
| 2014/0018034 A1* | 1/2014 | Lindberg | 455/405 |

FOREIGN PATENT DOCUMENTS

EP    2384049 A1    11/2011

OTHER PUBLICATIONS

International Search Report and Written Opinion received in International Application No. PCT/EP2012/058169, Applicant: Huawei Technologies Sweden AB, mailed Sep. 24, 2012, 10 pages.

* cited by examiner

*Primary Examiner* — Danh Le
(74) *Attorney, Agent, or Firm* — Slater & Matsil, L.L.P.

(57) ABSTRACT

A system and method for optimizing handover parameters for a plurality of mobile terminals on a common transportation platform in a cellular network includes at least a first terminal and a second terminal and a controller. The controller is configured to determine that each of the first and second terminal are on the common transportation platform, monitor a status of a handover attempt of the first terminal, and if the handover attempt is successful, adopt handover parameter settings of the first terminal for the second terminal, and if the handover attempt is not successful, change handover parameter settings for the second terminal.

13 Claims, 4 Drawing Sheets

OPTIMIZING PARAMETER SETTING FOR HANDOVER OF MOBILE TERMINALS ON A TRANSPORTATION PLATFORM

This application is a continuation of International Application No. PCT/EP2012/058169, filed on May 3, 2012, which is hereby incorporated by reference in its entirety.

TECHNICAL FIELD

The present invention relates generally to handover of mobile terminals on a transportation platform, and, in particular embodiments, to a systems and methods for optimizing parameter setting for handover of mobile terminals on a transportation platform.

BACKGROUND

The aspects of the present disclosure relate generally to wireless communication systems, and in particular to optimizing parameter setting for handover of mobile terminals on a transportation platform.

A cellular or wireless communication network generally includes a large number of cells. A cell, also may be referred to as a base transceiver station or a base station, may be generally defined as a fixed-location transceiver. When a user is communicating via a mobile terminal or device such as a cellular telephone, a communication link is established between the user's device and a cell. However, a cell has a limited area of communication or network coverage (also referred to range). Thus, a network is typically made up of a number of cells. As the user device moves from one cell (a source cell) to another cell (a target cell), a procedure referred to as "handover" or "handoff" is used to establish a new communication link between the user and the target cell and drop the communication link between the mobile device equipment and the source cell. A handover is generally triggered when the current connections of the user's device do not meet the radio connection's requirements in terms of signal strength. The changing of the connections during the handover operation can be affected by configuration of the handover procedures and the setting or parameters corresponding to the user's communication device and the cells.

In a Long Term Evolution (LTE) network, a handover is typically initially triggered by a measurement report sent from a user equipment to a serving eNB (evolved nodeB) or a serving cell. The serving eNB determines how the user equipment shall take measurements and under what conditions a measurement report shall be triggered and sent to the eNB. Different networks and network deployments can have different detailed behavior, but in most cellular networks it is natural to trigger handover when the signal reception from the target cell is stronger than the signal reception of the source cell. In the measurement report, the user equipment includes the reason for the handover trigger (e.g. target cell signal stronger than source cell) and measurements of the reference signal strength (RSRP) or quality (RSRQ) of the serving cell and several neighboring cells (including the target cell). To reduce ping-pong effects where the user equipment hands over repeatedly between two cells, a handover offset is added to the trigger condition. The signal from the target cell should be stronger than the signal from the source cell by a predetermined offset, such as greater than 0 dB, for example. Additionally, a timer can be used.

When a group of mobile terminals travel on a common transportation platform (CTP), such as a bus, light rail vehicle, or train, the mobile terminals share similar mobility characteristics. Normally, the handover of such mobile terminals have a significant impact on the total handover performance and perceived quality of experience and service, due to the relatively large proportion of mobile service usage by such mobile terminals.

For mobile terminals on a common transportation platform, the handover procedure can be designed so that optimal handover performance is achieved through utilization of the handover performance knowledge of the mobile terminals. Handover of mobile terminals on a CTP should be executed at optimal time for each mobile terminal to avoid signaling congestion. The preparation of the target cell (such as data forwarding in a 3GPP Long Term Evolution (LTE) handover procedure) can be done in advance, for each of the mobile terminals on the CTP. Information as about e.g. the route and velocity of the mobile terminals on the CTP and information about neighboring cell relations can also be utilized in the handover procedure.

Generally, when a number of handover failures occur, this can be typically caused by non-optimal handover parameter configuration and settings. The parameters can include for example, but are not limited to, received power offset between neighboring cells for handover purposes, often referred to as the signal strength hysteresis, and the time to trigger which represents a delay in sending a handover measurement report once the signal strength hysteresis has been met.

Generally, one way of optimizing handover parameters is to run an off-line optimization algorithm within an Operation and Administration Maintenance (OAM) system, and obtain optimal parameters solution for that handover failure problem. The new parameters can be set to the network, including network entities and terminals. Field engineers may run tests before the new parameters are formally committed. However, this process is slow and handover failures will continue to occur during this optimization process. Furthermore, the proposed parameters may be non-optimal by the time of implementation due to the time required to develop the new parameters and commit them to the system, and the need for continuous fine tuning.

Generally, conventional handover processes do not consider the characteristics for a group of mobile terminals with similar mobility behavior. It would be advantageous to be able to utilize the mobile terminals on a CTP for statistics collection in handover performance monitoring as well as an optimization process of setting and testing of handover parameters.

Accordingly, it would be desirable to provide an access and handover process within a communication network that solves at least some of the problems identified above and gain the advantages identified above.

SUMMARY OF THE INVENTION

One aspect of the present disclosure relates to a system for optimizing handover parameters for a plurality of mobile terminals on a common transportation platform in a network. In one embodiment the system includes at least a first terminal and a second terminal, and a controller. The controller is configured to determine that each of the first terminal and the second terminal are on the common transportation platform, monitor a status of a handover attempt of the first terminal, and if the handover attempt is successful, adopt a handover parameter setting of the first terminal for the second terminal.

Another aspect of the present disclosure relates to a method for optimizing handover parameter settings for terminals on a common transportation platform in a communication network. In one embodiment the method includes detecting a terminal, determining that the terminal is on a common transportation platform, monitoring a first handover performance corresponding to the terminal, determining if a handover of the terminal from a source cell to a target cell is successful, and changing a handover parameter setting for a next terminal on the common transportation platform to a second handover parameter if the handover of the terminal is not successful.

Another aspect of the present disclosure relates to a computer program product. In one embodiment, the computer program product includes computer readable code means, the computer readable code means when executed in a processor device being configured to: detect a proximity of a mobile communication device to a control module associated with a physical location of a communication network, establish a short distance communication link between the mobile communication device and the control module, authenticate the mobile communication device, transfer access information to the mobile communication device that will enable the mobile communication device to access one or both of the physical location of the communication network and a communication network, and execute a handover of the mobile communication device from a currently connected source cell to a target cell corresponding to the communication network using the access information.

These and other aspects and advantages of the exemplary embodiments become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
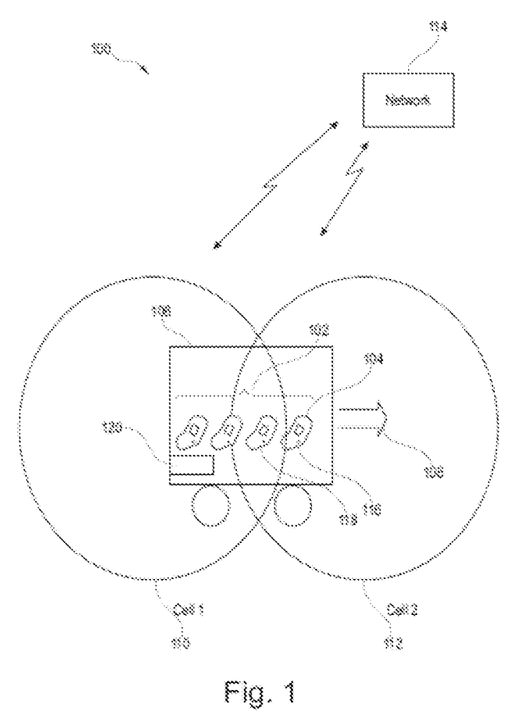
FIG. 1 illustrates a block diagram of one embodiment of system incorporating aspects of the present disclosure.

Referring to FIG. 1, one embodiment of a system 100, for optimizing parameter settings of mobile terminal handover on a common transportation platform (CTP) incorporating aspects of the present disclosure is illustrated. The aspects of the disclosed embodiments are directed to detecting a group of mobile terminals traveling together on a common transportation platform and collecting information of mobility characteristics to improve handover performance. When the performance of the handover of the mobile terminals on the CTP needs to be improved, the mobile terminals on the CTP can be used to collect performance statistics. The mobile terminals can also be used in an optimization process/algorithm to facilitate cures for problems such as handover failure by optimizing handover parameter settings.

FIG. 1 illustrates a group 102 of mobile terminals 104 traveling on a common transportation platform 106, generally referred to hereinafter as CTP. In one embodiment, the common transportation platform can include one or more of a subway, bus, light rail carriage, train or ship, or other such transportation vehicle that allows a group of mobile terminal users to gather and move together during transport. For the purposes of the description herein, the term "group" is generally used to refer to two or more mobile terminals. The term mobile terminals is generally used to refer to mobile communication devices such as cellular telephones, smart phones, pads and tablets, computing device, or any suitable device that is capable of communicating with a network, such as a cellular network or wireless local area network (WLAN) or any such other network as is generally known.

Referring to FIG. 1, the common transportation platform 106 is moving in the direction illustrated by the arrow 108, from a first or source cell area 110 to a second or target cell area 112. As can be seen from the figure, some of the mobile terminals 104 in the group 102 are located in the first cell area 110. Others are located in the second cell area 112, while others are in between the first and second cell areas 110, 112. As will be understood, the group 102 of mobile terminals 104 will generally approach the fringe regions of the cell areas 110, 112 at substantially the same time. Thus, it is possible that handover of each of the mobile terminals 104 from cell 110 to cell 112 will occur at substantially the same time, especially for terminals which are closely located.

When the group 102 of mobile terminals 104 travel on the common transportation platform 106, the mobile terminals 104 will normally handover from the source cell 110 to the target cell 112. The triggering points for the handover of each of the mobile terminals 104 from the source cell 110 to the target cell 112 will typically be close in time. The handover procedure for each of the mobile terminals 104, including signaling, will be similar, from the viewpoint of the network 114. In the embodiment shown in FIG. 1, typically, the first mobile terminal 116 will handover very close in time or before the next mobile terminal 118, as the first mobile terminal 116 will approach the target cell 112 very close in time before the next mobile terminal 118.

The aspects of the disclosed embodiments are directed to determining that the mobile terminals 104 are on a common transportation platform 106, monitoring the handover procedures and modifying the handover procedure or handover parameters to improve or optimize handover performance. In one embodiment, the network 114 can comprise one or more controllers that include one or more processors that are operable to detect a mobile terminal on a common transportation platform 106, monitor the handover procedures and modify the handover procedure or handover parameters to improve or optimize handover performance. In one embodiment, the controller(s) is comprised of machine-readable instructions that are executable by a processing device. Improving the handover performance can include, but is not limited to, increasing the handover success rate as well as decreasing the handover signaling load.

Figure 2:
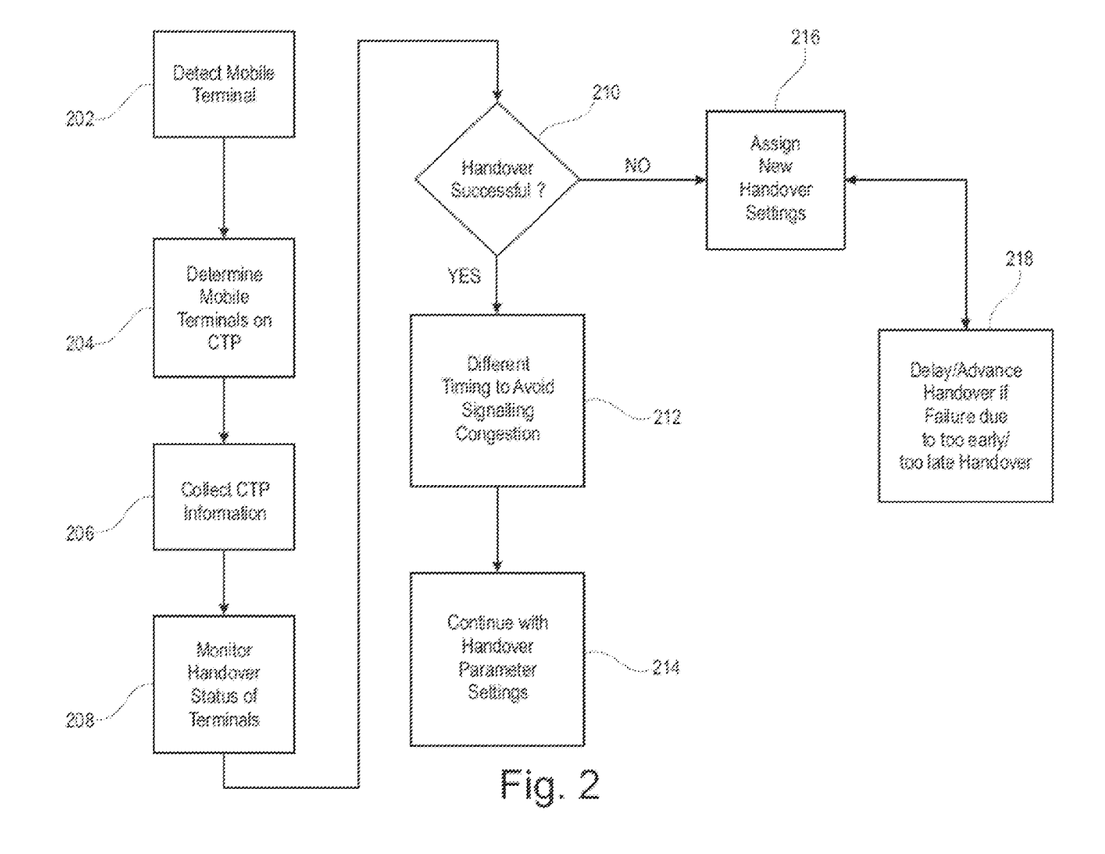
FIG. 2 illustrates one embodiment of a process flow incorporating aspects of the present disclosure.

Referring to FIG. 2, one embodiment of a process flow incorporating aspects of the present disclosure is illustrated. In one embodiment, the mobile terminals 104 are detected 202. It is then determined 204 that the mobile terminals 104 are on a common transportation platform 106. In one embodiment, determining 204 that the mobile terminals are on a common transportation platform can be carried out using conventional wireless communication technologies as well as non-conventional wireless communication technologies. For example, one way to determine a mobile terminal is on a common transportation platform 106 is through terminal localization. The localization can be done by GPS based method or a radio fingerprint based method, where a mobile terminal measures the received signal strength or power from different or neighboring cells. The combination of measured power values from different cells can be used as an indicator of the location of a mobile terminal. In one embodiment, satellite based localization can be used. A mobile terminal can report its location information to the network 114 or the localization can be done at the network side. Historical records of such measurements, such as past measurements, can also be used to enhance the identification accuracy on whether a mobile terminal is on the common transportation platform 106.

The route and timing information of the common transportation platform is also generally be known. Such information is typically maintained by the network 114 or a vehicle information management system. Although not shown, there can be an information or communication link between the network 114 and the vehicle information management system that allows such information to be obtained and exchanged.

When using non-conventional wireless communication technologies to determine 204 that the mobile terminals 104 are on a common transportation platform 106, one or more of the identifiers of the mobile terminals 104 or the common transportation platform 106 can be utilized to determine that a mobile terminal is traveling with other mobile terminals 104 that are on the same common transportation platform 106. For example, in one embodiment, on a common transportation platform 106, certain devices or terminals 120 can be used to broadcast, using short distance technology communications, an identifier of the common transportation platform 106 to the network 114 to identify that the mobile terminals 104 are on the common transportation platform 106. The short distance communication technologies can include, but are not limited to Bluetooth, Zigbee, near field communication and sensors. The device 120 can be an onboard device, such as an accessory to a local network access point that can provide mobile service to the mobile terminals 104 on the common transportation platform 106. In alternate embodiments, the short distance or range communication device 120 can comprise a local onboard access point that can act as a relay station between the mobile terminals 104 and the network 114. The distance can be such that only the mobile terminals 104 on board the common transportation platform 106 can communicate with the device 120. The short range communication device 120 is configured to transmit information to a cellular network via a cellular radio link between the common transportation platform 106 and the cellular network. The short range communication is only between the mobile terminals 104 on the common transportation platform 106 and the onboard short range communication device 120, meaning there is no short range communication between the onboard short range communication device 120 and a mobile device that is not on the common transportation platform 106. In one embodiment, the radio link between the short range communication device 120 and the cellular network is a cellular radio link that is not a short range radio link.

In one embodiment, the identifier of the common transportation platform 106 can be sent from the device 120 to the mobile terminals 104, and in turn sent by the mobile terminals 104 to the network 114. In another embodiment, the short distance communication can be in the opposite direction, where the identifiers of the mobile terminals 104 are transmitted to the device 120, and the device 120 sends the identifier information of mobile terminals 104 to the network 114. In one embodiment, an on board wireless service is enabled to the mobile terminals 104 by a local onboard access point after the identifier communication exchange between the on board short distance communication device 120 and the mobile terminals 104 is complete.

The mobile terminals 104 that receive the same identifier of device 120 can be determined to be traveling on the same common transportation platform 106. In one embodiment, the short distance communication device 120 can be integrated into a tariff charging (or travel card registration) terminal onboard the common transportation platform 106. The mobile terminals 104 will report the received identifier information, such as the identifier of the onboard terminal 120 and the identifier of the common transportation platform 106, back to the network 114.

Information about the common transportation platform 106, such as the moving route, the moving schedule, the identifiers of the cells 110, 112 that cover the moving route, can be used in determining 204 if the mobile terminals 104 are on the common transportation platform 106. For example, when the common transportation platform 106 is a subway train, the route of the subway train and the timing will be known to the network 114. Generally, this type of information is needed for the information link between the subway train management and the network 114. The measured power values from neighboring cells 110, 112 along the route, as measured by the mobile terminals 104, or the identifier of onboard device 120 on the subway train, as reported to and by the mobile terminals 104, can be used to determine that the mobile terminals 104 are on the same subway train.

After it is determined 204 that the mobile terminals 104 are traveling on a common transportation platform 106, in one embodiment, certain information about the mobile terminals 104 can be collected 206. This information can include, but is not limited to, the schedule and route of the common transportation platform 106, the identifier of the common transportation platform 106, the identifier of the onboard device 120, the identifiers of cells along or covering the route of the common transportation platform 106, as well as the geo-location information of each cell or cell borders. In one embodiment, the geo-location information of the intersection points of the cell borders and the mobile route of the common transportation platform 106 is obtained.

In one embodiment, the handover parameters of the mobile terminals 104 on the common transportation platform 106 are controlled 208 by the network 114 in order to achieve improved handover performance. The network 114 monitors 210 the handover status of the group 102 of mobile terminals 104. In one embodiment, the network 114 requires the first one 116 of the group 102 to use certain predetermined handover parameters in the handover from source cell 110 to target cell 112. In one embodiment, these can be default handover parameters. The network 114 monitors the execution of the handover of terminal 116 from cell 110 to cell 112, and the outcome of the handover procedure. If the handover is successful, the network 114 can require that the next terminal 118 to use the same parameter settings. In this sequence, as each of the mobile terminals 104 successfully executes a handover, the network 114 will require each subsequent terminal 118 to use the same parameters as the prior terminal 116. If a handover is not successful for a prior terminal 116, the network 114 can assign or require the next terminal 118 in the group 102 to use a different set of handover parameters in order to avoid a handover failure.

In one embodiment, the network 114 of FIG. 1 can ask the mobile terminals 104 on the same common transportation platform 106 to adopt different timing for respective handovers in order to avoid signaling congestion, especially for terminals which are closely located. As will be understood, as the group 102 of mobile terminals 104 travels together on the common transportation platform 106, the group 102 will reach cell boundary areas at substantially the same time. Thus, each of the mobile terminals 104 may determine that a handover is required, and may attempt a handover at substantially the same time. In order to avoid the signaling congestion that can result from all of the mobile terminals 104 attempting a handover at substantially the same time, the network can request different handover timings for each of the mobile terminals 104. In one embodiment, this can include arranging different "time to trigger" handovers for mobile terminals 104 that would otherwise perform a handover at substantially the same time. This delay between handovers for each of the mobile terminals 104 on the common transportation platform 106 can reduce signaling congestion.

Generally, when a number of handover failures occur, this can be typically caused by non-optimal handover parameter settings. The parameters can include for example, but are not limited to, received power offset between neighboring cells for handover purposes, often referred to as the signal strength hysteresis, the time to trigger which represents a delay in sending a handover measurement report once the signal strength hysteresis has been met. The aspects of the disclosed embodiments are configured to detect when handover issues or failures occur and optimize the handover parameters in order to avoid handover failure.

Typically, one way of optimizing handover parameters is to run an off-line optimization algorithm within as an Operation and Administration Maintenance (OAM) system, and obtain optimal parameters for that handover location. The new parameters can be set into the network, including network entities and terminals. Field engineers may run tests before the new parameters are formally committed. However, this process is slow and more handover failures will continue to occur during this optimization process. Furthermore, the proposed parameters may be non-optimal by the time of implementation due to the time required to develop the new parameters and commit them to the system, and the need for continuous fine tuning.

Figure 3:
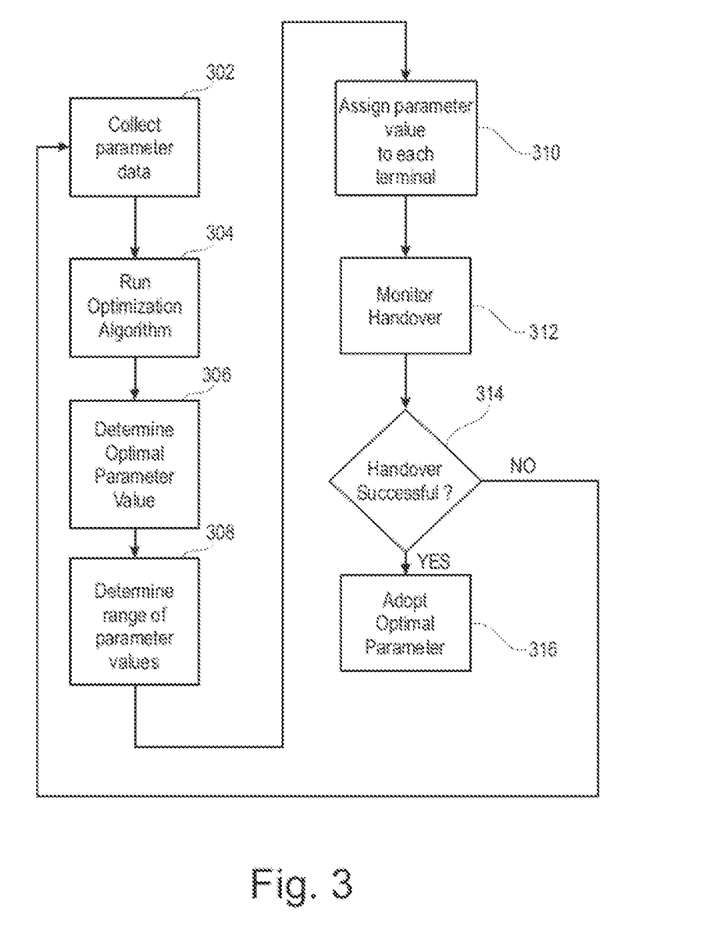
FIG. 3 illustrates another embodiment of a process flow incorporating aspects of the present disclosure.

The mobile terminals 104 on the common transportation platform 106 can be utilized to help in the fine tuning process and reduce the need for human intervention. Referring to FIG. 3, one embodiment of a process to optimize handover parameters in a system incorporating aspects of the present disclosure is illustrated. In one embodiment, when it is determined that the handover performance needs to be improved, the mobile terminals 104 on the common transportation platform 106 can be used to collect 302 parameter data and performance statistics. The mobile terminals 104 can also be involved in an optimization process to facilitate a quicker cure for a handover failure.

In one embodiment, an optimization algorithm is executed 304 to suggest optimal parameter values, using the information and data gathered by the mobile terminals 104. The optimization algorithm can suggest 306 an optimal parameter value for a handover. Once an optimal parameter value is determined, a range of parameter values around the optimal parameter value can be established 308. One parameter value within this range can be assigned 310 to each of the mobile terminals 104 in the group 102 on the common transportation platform 106. Note all the parameter values within this range are considered as viable values by the optimization algorithm.

Subsequent handovers with the test parameters are monitored 312 and it is determined 314 whether a handover is successful. The mobile terminals 104 act as test terminals to determine 314 the optimal parameter setting for the network 114. This allows the mobile terminals 104 to facilitate a quicker cure of handover failures in a real traffic environment than previously known, while at the same time reducing the need for human intervention or testing.

Figure 4:
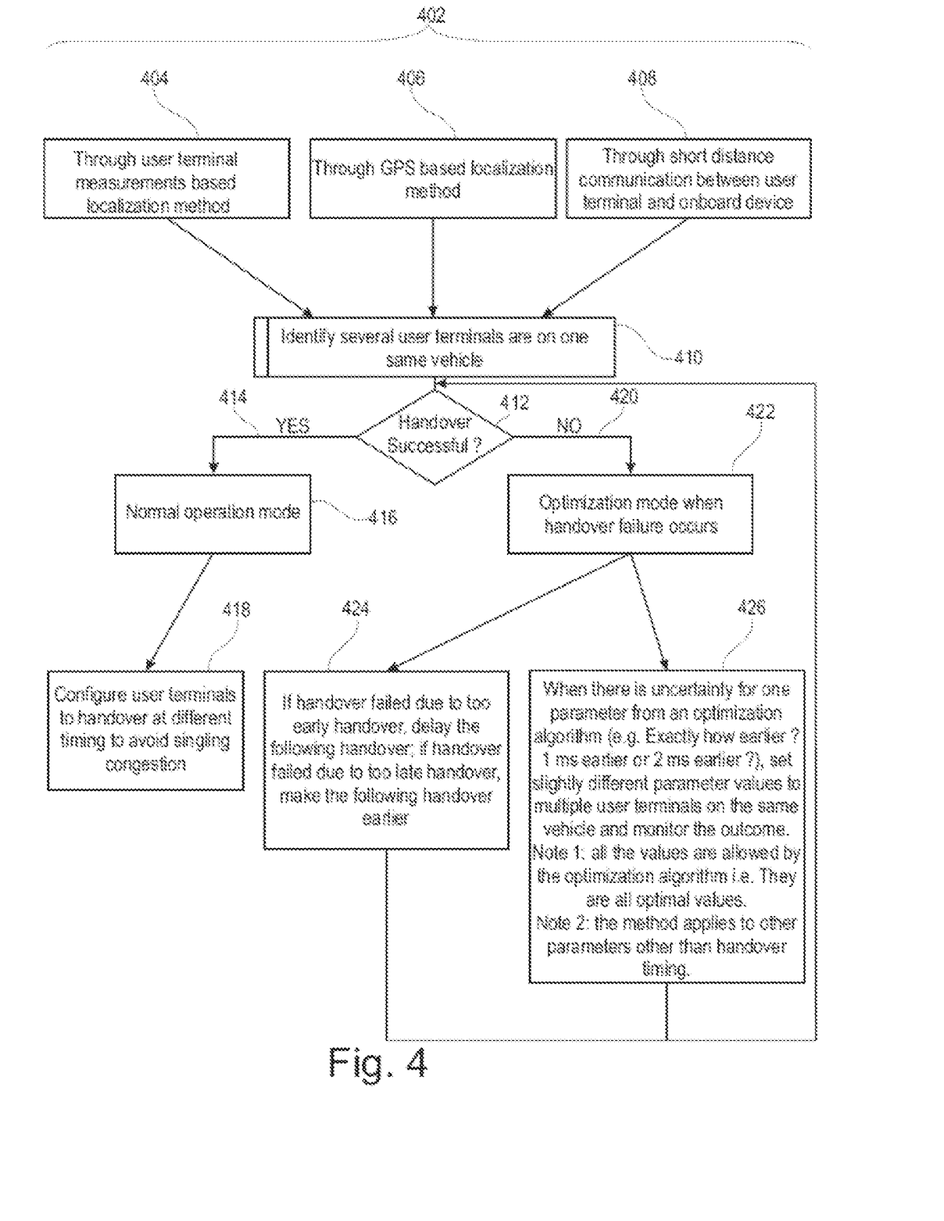
FIG. 4 illustrates a further embodiment of a process flow incorporating aspects of the disclosed embodiments.

FIG. 4 illustrates another embodiment of a process flow incorporating aspects of the present disclosure. In one embodiment, the mobile terminals 104 are located 402 on a common transportation platform. The location can be determined through any one or more of a measurement based localization process 404, a GPS based localization process 406 or a short distance communication 408 between the mobile terminals 104 and an onboard short distance communication device 120. The communication between mobile terminals 104 and the device 120 is short distance such that only mobile terminals on the common transportation platform can have such communication with the device 120. In one embodiment, the device 120 can comprise one or more controllers that include one or more processors that are operable to detect a mobile terminal on a common transportation platform 106 and transfer data, such as the identifier of the mobile terminal, after the short distance communication with the mobile terminal, to the network 114. In one embodiment, the device 120 can comprise one or more controllers that include one or more processors that are operable to detect a mobile terminal on a common transportation platform 106 and transfer data, such as the identifier of the device 102, the identifier of the common transportation platform 106 to the mobile terminal. The mobile terminal then transfers the identifiers of the device 120, and the common transportation platform 106 to the network 114. In one embodiment, the controller(s) is comprised of machine-readable instructions that are executable by a processing device. It is then determined 410 that there are more than one mobile terminals 104 on the same common transportation platform.

A determination 412 is made as to whether or not a handover from a source cell 110 to a target cell 112 is successful. If yes 414, the mobile terminals 104 in the group 102 operate 416 in a normal mode using currently established handover parameters. In one embodiment, the mobile terminals 104 are configured 418 by the network 114 to execute handovers at different timing to avoid signaling congestion.

If the determination 412 is that the handover was not successful 420, in one embodiment, the network 114 implements an optimization mode 422. In one embodiment, if the handover failure was due to timing, the timing of the next handover can be adjusted 424. For example, if the handover failed because the handover attempt occurred too early in time, a delay can be implemented in the next handover attempt. If the handover failed because the handover attempt occurred to late in time, the next handover will be made to occur earlier.

After a handover failure occurs to one terminal, an optimization algorithm is engaged and suggests multiple viable parameter values to cure the problem. Even all those values of the parameter are viable according to the optimization algorithm; there is uncertainty as to which one is the optimal value of the parameter. In one embodiment, mobile terminals can be assigned 426 different values of the parameter for the next handover attempt at the same location where the handover failure has occurred and the results monitored. The mobile terminals are not necessarily on the same vehicle as the mobile terminal having handover failure but they are to have handover at the same location. For example, if handover failure occurs to one mobile terminal at the first carriage of one train, the terminals on the following carriage can be made to test different parameter values and they can have handover at the same location where the handover failure has occurred. The different parameter values are generally those that are determined by the optimization algorithm or otherwise determined to be a suitable or potentially viable parameter values. After the next handover attempt at the same handover location as the failure has occurred, the handover results can be monitored. A parameter value associated with a successful handover attempt from the group 102 can be considered as an optimal parameter value and assigned to mobile terminals for subsequent handovers especially for that location.

The disclosed embodiments may also include software and computer programs incorporating the process steps and instructions described above. In one embodiment, the programs incorporating the process described herein can be stored on or in a computer program product and executed in one or more computers. One or more of the devices of the system 100 shown in FIG. 1 can each include computer readable program code means stored on a computer readable storage medium for carrying out and executing the process steps described herein. In one embodiment, the computer readable program code is stored in a memory of one or more of the devices shown in FIG. 1. In alternate embodiments, the computer readable program code can be stored in memory or memory medium that is external to, or remote from system 100. The memory can be direct coupled or wireless coupled.

In one embodiment, the devices shown in the system 100 of FIG. 1 may include and/or be coupled to one or more processor devices or computer systems that are capable of sending information to each other and receiving information from each other. In one embodiment, the network 102 can be communicatively coupled with the Internet. The devices shown in FIG. 1 can be linked together in any conventional manner, including for example, a modem, wireless connection, hard wire connection, fiber optic or other suitable data link. Information can be made available to the devices shown in the system 100 of FIG. 1 using a communication protocol typically sent over a communication channel or other suitable communication line or link.

The devices of the system 100 shown in FIG. 1 are generally configured to utilize program storage devices embodying machine-readable program source code that is adapted to cause the apparatus to perform and execute the method steps and processes disclosed herein. The program storage devices incorporating aspects of the disclosed embodiments may be devised, made and used as a component of a machine utilizing optics, magnetic properties and/or electronics to perform the procedures and methods disclosed herein. In alternate embodiments, the program storage devices may include magnetic media, such as a diskette, disk, memory stick or computer hard drive, which is readable and executable by a computer. In other alternate embodiments, the program storage devices could include optical disks, read-only-memory ("ROM") floppy disks and semiconductor materials and chips.

Each of the devices of the system 100 of FIG. 1, including the mobile terminals 104, the cells 110, 112, and the network 114 may also include one or more processors for executing stored programs, and each may include a data storage or memory device on its program storage device for the storage of information and data. The computer program or software incorporating the processes and method steps incorporating aspects of the disclosed embodiments may be stored in one or more computer systems or on an otherwise conventional program storage device.

The aspects of the disclosed embodiments allow optimizing parameter settings for handover of mobile terminals on a common transportation platform. Once it is determined that a group of mobile terminals are traveling together on a common transportation platform, the handover parameters and performance of the mobile terminals can be monitored. If the handover performance is poor or if there are handover failures, an optimization process can be used to determine optimal handover parameters. The values of parameter, within a range, can be tested on each of the mobile terminals to determine an optimal parameter setting. This setting can then be propagated to each subsequent mobile terminal to be used in the handover process. The aspects of the disclosed embodiments can provide for solving handover issues on the fly in a real traffic environment, while reducing the need for human intervention.

Thus, while there have been shown, described and pointed out, fundamental novel features of the invention as applied to the exemplary embodiments thereof, it will be understood that various omissions and substitutions and changes in the form and details of devices illustrated, and in their operation, may be made by those skilled in the art without departing from the spirit and scope of the invention. Moreover, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for optimizing handover parameters for a plurality of mobile terminals on a common transportation platform in a cellular network, the system comprising:
   at least a first mobile terminal and a second mobile terminal; and
   a controller, the controller being configured to:
      detect the first mobile terminal and the second mobile terminal;
      determine that each of the first mobile terminal and the second mobile terminal is on the common transportation platform;
      detect a first handover parameter corresponding to the first mobile terminal;
      determine if a handover of the first mobile terminal from a source cell to a target cell is successful; and
      change a handover parameter setting for the second mobile terminal on the common transportation platform to a second handover parameter if the handover of the first mobile terminal is not successful.

2. The system of claim 1, wherein the controller is further configured to require the second mobile terminal to use the first handover parameter for a handover of the second mobile terminal from the source cell to the target cell if the handover of the first mobile terminal is successful.

3. The system of claim 1, wherein the controller is further configured to adjust a handover timing of the second mobile terminal to be different from a handover timing of the first mobile terminal.

4. The system of claim 1, wherein if the handover of the first terminal is not successful, the controller is further configured to:

if the handover of the first mobile terminal is too early, delay a timing of a subsequent handover of the second mobile terminal; and if the handover of the first mobile terminal is too late, advance a timing of a subsequent handover of the second mobile terminal.

5. A controller, comprising a memory in communication with a processor, the memory including program instructions for execution by the processor to:
   detect a mobile terminal;
   determine that the mobile terminal is on a common transportation platform;
   detect a first handover parameter corresponding to the mobile terminal;
   determine if a handover of the mobile terminal from a source cell to a target cell is successful; and
   change a handover parameter setting for a next mobile terminal on the common transportation platform to a second handover parameter if the handover of the mobile terminal is not successful.

6. The controller of claim 5, wherein the memory further includes program instructions for execution by the processor to:
   require the next mobile terminal to use the first handover parameter for a handover of the next mobile terminal from the source cell to the target cell if the handover of the mobile terminal is successful.

7. The controller of claim 5, wherein the memory further includes program instructions for execution by the processor to:
   determine that the next mobile terminal is on the common transportation platform; and
   adjust a handover timing of the next mobile terminal to be different from a handover timing of the mobile terminal.

8. The controller of claim 7, wherein the handover timing of each of the mobile terminal and the next mobile terminal is a time to trigger handover parameter.

9. The controller of claim 5, wherein the memory further includes program instructions for execution by the processor to:
   determine that the handover of the mobile terminal is not successful;
   if the handover of the mobile terminal is too early, delay a timing of a subsequent handover of the next mobile terminal; and
   if the handover of the mobile terminal is too late, advance the timing of the subsequent handover of the next mobile terminal.

10. The controller of claim 5, wherein the memory further includes program instructions for execution by the processor to:
    detect that the handover of the mobile terminal is not successful;
    initiate an optimization procedure using the first handover parameter;
    generate an optimized handover parameter from the optimization procedure;
    assign the optimized handover parameter to the next terminal;
    execute a handover of the next terminal using the optimized handover parameter; and
    if the handover of the next terminal is successful, adopt the optimized handover parameter for subsequent handovers for other mobile terminals on the common transportation platform.

11. A method for optimizing handover parameters for a plurality of mobile terminals on a transportation platform, the method comprising:
    detecting a first mobile terminal and a second mobile terminal;
    determining that each of the first mobile terminal and the second mobile terminal is on the transportation platform;
    detecting a first handover parameter relating to the first mobile terminal;
    determining whether a handover of the first mobile terminal from a source cell to a target cell is successful; and
    changing a handover parameter setting for the second mobile terminal to a second handover parameter if the handover of the first mobile terminal is not successful.

12. The method of claim 11, further comprising:
    requiring the second mobile terminal to use the first handover parameter for a handover of the second mobile terminal from the source cell to the target cell if the handover of the first mobile terminal is successful.

13. The method of claim 11, further comprising:
    adjusting a handover timing of the second mobile terminal to be different from a handover timing of the first mobile terminal.

* * * * *